May 1, 1923.
V. O. MOUTRAY
TIRE FILLER
Filed June 3, 1921
1,453,884
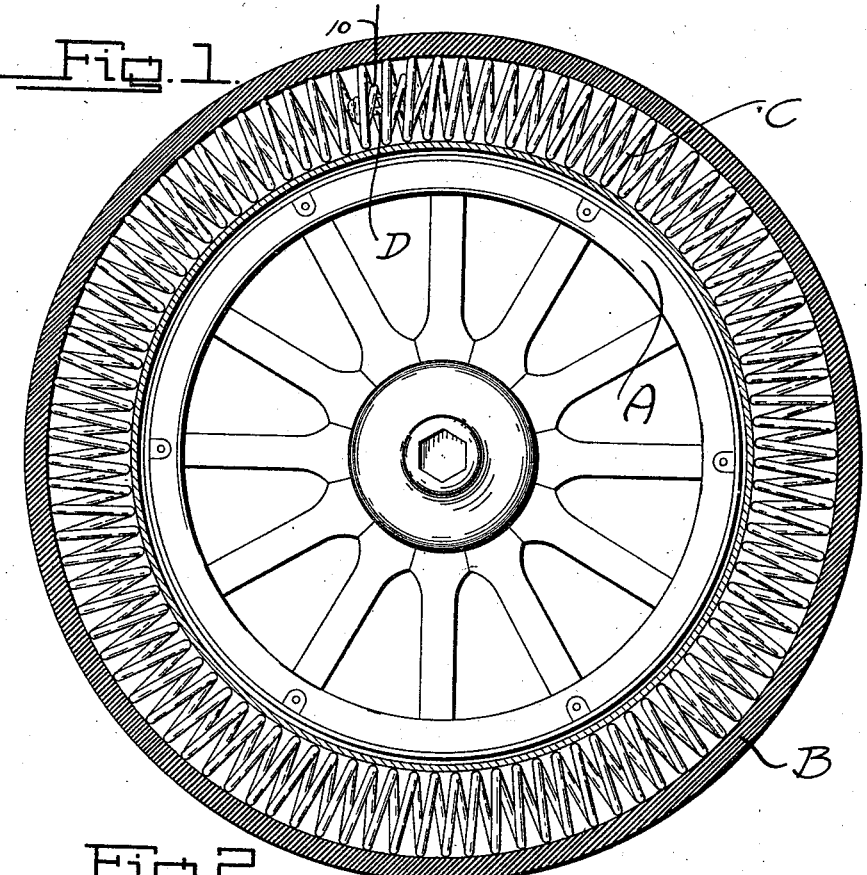
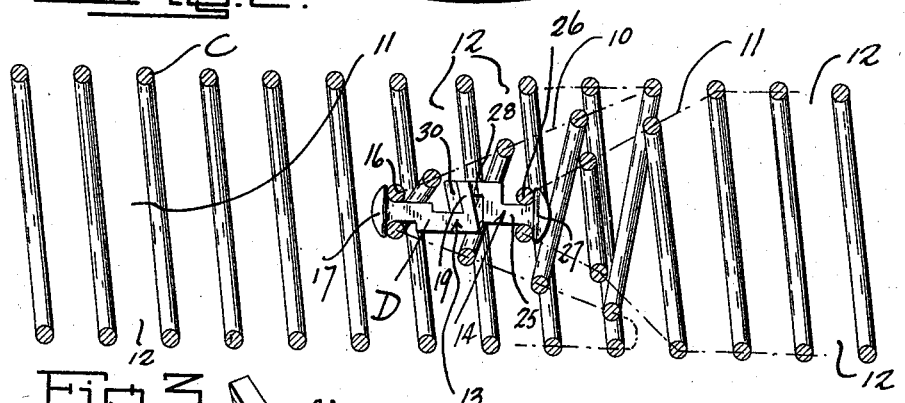
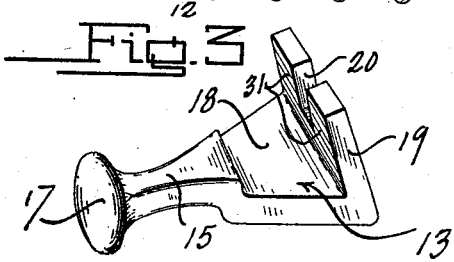
Inventor
Van O. Moutray.

Patented May 1, 1923.

1,453,884

UNITED STATES PATENT OFFICE.

VAN O. MOUTRAY, OF MUSKOGEE, OKLAHOMA.

TIRE FILLER.

Application filed June 3, 1921. Serial No. 474,615.

*To all whom it may concern:*

Be it known that I, VAN O. MOUTRAY, a citizen of the United States, residing at Muskogee, in the county of Muskogee and State of Oklahoma, have invented certain new and useful Improvements in Tire Fillers, of which the following is a specification.

This invention relates to fillers for tire casings.

The primary object of the invention is the provision of a filler of the resilient spring type, for use in a tire casing, to support said casing in even, taut, and expanded manner; preferably without pneumatic aid.

A further object of the invention is the provision of a spiral spring type of filler, so designed as to be evenly disposed in a tire casing for supporting the same, and having a uniform bearing surface interiorly of the casing; the filler including novel means for maintaining the ends thereof in seated interlocked relation.

Other objects and advantages will be apparent during the course of the following detailed description.

In the accompanying drawing, forming a part of this specification, and in which similar reference characters designate corresponding parts throughout the several views.

Figure 1 is a side elevation of a vehicle wheel with a tire thereon, the tire casing being fragmentarily shown to illustrate the improved filler in position interiorly thereof.

Figure 2 is an enlarged fragmentary circumferential section of the filler, showing the method of detachably locking the ends thereof together.

Figure 3 is an enlarged perspective view of a locking element used in the improved filler.

In the drawing, wherein for the purpose of illustration is shown the preferred embodiment of my invention, the letter A designates a vehicle wheel having the tire casing B mounted thereon in any approved manner. The tire casing B is provided with the resilient filler member C, the ends of the member C being maintained in detachable interlocked relation by a locking device D.

The vehicle wheel A, can of course, be any approved type of wheel, of the spoke or disc type, and having a tire casing B, preferably of the resilient type now in use, attached thereto in any approved manner.

The filler C may be disposed immediately within the casing B, or may be disposed therein in any approved manner; depending upon the type of casing used, and the manner of assemblying the filler therein.

The filler C is preferably of the spiral resilient spring type, the wire thereof being twisted in spiral formation to provide a single body thereof for disposition interiorly in the casing B.

For convenience in assemblying within the casing B and to facilitate manufacture of the spring C, the same is preferably of single length, having one end 10 thereof, spirally receding in tapered manner inwardly of the longitudinal run thereof, as provided by the spiral filler, for a purpose to be subsequently set forth. The opposite end 11 of the length of filler C is tapered, in projecting manner longitudinally of the filler. Thus when the filler C is disposed circumferentially within the casing B as illustrated in Figure 1 of the drawings, the end 11 will be telescopically disposed within the receding tapered end 10; the ends 10 and 11 having been designated as to their contour by the dot and dash lines in Figure 2 of the drawing. By this arrangement, a symmetrical and uniform bearing surface is maintained circumferentially about the interior of the casing B, to expand the same uniformly throughout. The spaces 12 intermediate adjacent arcuations of the wire, will be uniform, circumferentially about the filler C, even at the point of connection, as designated by the ends 10 and 11.

The locking device D preferably comprises interfitting latch members 13 and 14 provided for engagement upon the ends 10 and 11. The member 13 is provided with a neck or shank 15 adapted for receiving the extreme end loop 16, of the tapered seating portion 10; a head 17 being formed outwardly of the neck 15 adapted to contact the outer surface of the looped end 16, for maintaining the member 13 on the tapered end 10. A base portion 18 is provided slightly offset below the neck 15, whereby the neck 15 can extend axially through the tapered end 10, thus disposing the base 18 of the member 13 below the axis of the seating end 10. An upwardly projecting flange 19 is provided upon the extreme end of the base 18 and opposite the end 17; said flange 19 extending upwardly and inwardly to form an acute angle with respect to the base 18. A slot or recess 20 is provided downwardly in the flange 19 to bifurcate said flange 19. The member 14 comprising a part of the locking means D, is similar in formation to the member 13. It comprises a neck portion 25 adapted for seating in the extreme looped end 26 of the projecting tapered end 11; a head 27 being formed upon the neck 14 adapted to contact the inside of the extreme loop 26. A base extension 28 is offset with respect to the neck 25 and preferably integral therewith, said base extension 28 being substantially the same width as the opening or slot 20, to permit free insertion of said base extension 28 therein. A head flange 30 is provided integral upon the base extension 28, and directly opposite the retaining head 27. This flange 30 is preferably disposed integral upon the head 28 and downwardly inclined to form an acute angle with the base 28. It is preferred that the head flange 30 be the same width as the flange 19 upon the member 13, since when engaging the member 13, the flange 30 will contact the interior surface 31 of the flange 19.

As before mentioned, the filler C may be positioned in any approved manner within the casing B. The projecting end 11 is provided for seating within the tapered or conical seating end 10. In locking the device D the shank 28 is disposed downwardly in the slot 20, the flange 30 thus contacting the interior surface 31 of the flange 19, and since the filler C is under tension, the latch members 13 and 14 will maintain the ends 10 and 11 in proper relation, whereby the convolution of the filler C will be properly spaced circumferentially within the casing B, and preventing any inaccuracies liable to pinch or wear upon the interior of said casing B.

From the foregoing it can be seen that the locking member D will maintain the proximate ends of the filler C in proper circumferential alignment.

Various changes in the shape, size and arrangement of parts may be made to the form of the invention herein shown and described, without departing from the spirit of the invention or the scope of the claims.

I claim:

1. A tire filler having one end projecting in tapered formation, and the opposite end inwardly tapered to form a seat for the projecting tapered end for disposing said ends in telescopic formation to form a circular tire filler.

2. A tire filler having one end projecting in tapered formation, the opposite end inwardly tapered to form a seat for the projecting tapered end for disposing said ends in telescopic formation, and means for locking said ends together to form a circular tire filler.

3. A tire filler of inherent resiliency having its opposite ends seated in telescopic relation to form a circular tire filler of uniform cross section, and means for detachably locking said ends together.

4. A tire filler of spiral spring formation having one end thereof receding in tapered formation, and the opposite end thereof outwardly projecting in tapered formation said projecting end adapted to be seated in said receding end for providing a filler of uniform diameter.

5. A tire filler of inherent resiliency having its opposite ends seated in telescopic formation to form a circular filler of uniform cross section, and a latch element on each end of said filler for inter-engagement to lock said filler ends in telescopic relation.

6. In a device of the class described, the combination of a tire filler having the free ends thereof in proximate relation, and a latch element upon each of said ends adapted for inter-engagement to form a substantially circular filler.

7. A device of the class described comprising an expansible tire filler, and a substantially L-shaped latch member upon each end of the tire filler adapted for inter-engagement.

8. As an article of manufacture, a tire filler latch comprising a pair of inter-engaging substantially L-shaped members.

VAN O. MOUTRAY.